US012455783B2

(12) United States Patent
Chen et al.

(10) Patent No.: US 12,455,783 B2
(45) Date of Patent: Oct. 28, 2025

(54) INFRASTRUCTURE FOR PREVENTING COMPROMISE OF OPERATING SYSTEM KERNELS DUE TO DISCOVERED ERRORS

(71) Applicant: THE REGENTS OF THE UNIVERSITY OF COLORADO, Denver, CO (US)

(72) Inventors: Yueqi Chen, Broomfield, CO (US); Zicheng Wang, Broomfield, CO (US)

(73) Assignee: The Regents of the University of Colorado, Denver, CO (US)

( * ) Notice: Subject to any disclaimer, the term of this patent is extended or adjusted under 35 U.S.C. 154(b) by 0 days.

(21) Appl. No.: 18/658,565

(22) Filed: May 8, 2024

(65) Prior Publication Data

US 2024/0378110 A1 Nov. 14, 2024

Related U.S. Application Data

(60) Provisional application No. 63/464,887, filed on May 8, 2023.

(51) Int. Cl.
*G06F 11/00* (2006.01)
*G06F 11/07* (2006.01)

(52) U.S. Cl.
CPC ...... *G06F 11/0793* (2013.01); *G06F 11/0766* (2013.01)

(58) Field of Classification Search
CPC ............. G06F 11/0793; G06F 11/0751; G06F 11/0766; G06F 11/0706
USPC ....................................................... 714/1–57
See application file for complete search history.

(56) References Cited

U.S. PATENT DOCUMENTS

| 9,842,017 B1* | 12/2017 | Zhang ................... G06F 11/079 |
| 2014/0281748 A1* | 9/2014 | Ercegovac .......... G06F 11/0727 714/49 |
| 2014/0359370 A1* | 12/2014 | Beskrovny .......... G06F 11/3696 714/38.1 |
| 2016/0098334 A1* | 4/2016 | Hariharakrishnan ...................... G06F 11/3466 702/186 |
| 2020/0250334 A1* | 8/2020 | Bandi ...................... G06F 21/78 |
| 2024/0086558 A1* | 3/2024 | Jadhav ................ G06F 21/6218 |

* cited by examiner

*Primary Examiner* — Sarai E Butler
(74) *Attorney, Agent, or Firm* — Workman Nydegger

(57) ABSTRACT

A method for preventing an error from being triggered includes receiving a sanitizer report of a program as an input, analyzing the sanitizer report to find information about an error in a sanitized kernel image, mapping the information about the error to a native kernel image, constructing a triggering condition based on the information in a native kernel image, and in a case where the triggering condition is met, sending a command to an operating system to kill the program in the native kernel image.

20 Claims, 9 Drawing Sheets

```
apparmor_setprocattr
<0xffffffff8180b5b0>:
+0x109: lea 0x0(%r13, %r12, 1), %r14
...
+0x111: call <__asan_store1>
+0x116: movb $0x0, (%r14);
```
← 510

```
DW_AT_name ("args") location (R13)
DW_AT_name ("size") location (R12)
file_names: "security/apparmor/lsm.c"
Address              Line
0xffffffff8180b6b9   645
0xffffffff8180b6c6   645
```
520 →

```
security/apparmor/lsm.c
624: static int
apparmor_setprocattr(...)
...
645:   args[size] = '\0';
```
← 530

```
DW_AT_name ("args") location (RSI)
DW_AT_name ("size") location (RDX)
file_names: "security/apparmor/lsm.c"
Address              Line
0xffffffff814dea0f   645
```
540 →

```
apparmor_setprocattr
<0xffffffff814de980>:
...
+0x8f: movb $0x0, (%rsi, %rdx, 1);
```
← 550

FIG. 5

INFRASTRUCTURE FOR PREVENTING COMPROMISE OF OPERATING SYSTEM KERNELS DUE TO DISCOVERED ERRORS

CROSS-REFERENCE TO RELATED APPLICATIONS

This application claims the benefit of and priority to U.S. Provisional Patent Application Ser. No. 63/464,887 filed on May 8, 2023, and entitled "AN INFRASTRUCTURE FOR PREVENTING COMPROMISE OF OPERATING SYSTEM KERNELS DUE TO DISCOVERED ERRORS," which is expressly incorporated herein by reference in its entirety.

FIELD

This disclosure relates to systems and methods for remedying a kernel error in an operating system, and more particularly for analyzing a kernel error based on a report and preventing the discovered error from being triggered.

BACKGROUND

Computers have been prevalent in modern days for decades, and the importance of operating systems has likewise increased because the operating systems are brains of the computers. Further, mobile devices, portable devices, and even Internet-of-Thing (IoT) devices need operating systems or kernels. Furthermore, the operating systems or kernels are special programs, on which backend and frontend programs are executed and performed.

Operating systems or kernels are widely used in cloud servers, mobile phones, transportation systems, and even nuclear plants. However, these systems are sophisticated and error prone. When there are bugs or errors in the operating systems and frontend and backend programs, such bugs can cause problems in the operating systems. In the worst case, such bugs can crash the operating systems or attackers can craft Proof-of-Concept (PoC) programs or exploit to compromise the kernel or even escalate privilege to steal sensitive data.

Due to a lack of manpower, nowadays, it takes a long time (66 days on average in the Linux kernel) to fix a kernel error by releasing an official patch. During this time window, integrity and security of the operating systems are still at risks, and adversaries can compromise the kernel and launch cyberattacks using the error.

BRIEF SUMMARY

Disclosed aspects include an infrastructure that can prevent discovered errors from being triggered and exploited in operating systems or kernels. It takes an error report by one or more sanitizers as an input and constructs a related triggering condition of the corresponding error. If the triggering condition is met, the infrastructure may skip error sites in the native kernel image, terminate the malicious process, and return the kernel to normal states.

According to various aspects, illustrated is a method for preventing an error from being triggered. The method includes receiving a sanitizer report of a program as an input, analyzing the sanitizer report to find information about an error in a sanitized kernel image, mapping the information about the error to a native kernel image, constructing a triggering condition based on the information in the native kernel image, and in a case where the triggering condition is met, sending a command to an operating system to kill the program in the native kernel image.

According to various aspects, illustrated is a system for preventing an error from being triggered. The system includes a processor; and a memory including instructions that, when executed by the processor, cause the system to function as: a first layer including prevention policy templates to address errors in a sanitized kernel image. The system further includes a second layer including a report processor configured to receive a sanitizer report of a program as an input and analyze the sanitizer report to find information about an error in the sanitized kernel image, map the information about the error to a native kernel image, construct a triggering condition based on the information in the native kernel image, and in a case where the triggering condition is met, send a command to an operating system to kill the program in the native kernel image.

According to various aspects, illustrated is a non-transitory computer readable medium including instructions stored thereon that, when executed by a computer, perform a method for preventing an error from being triggered. The method includes receiving a sanitizer report of a program as an input, analyzing the sanitizer report to find information about an error in a sanitized kernel image, mapping the information about the error to a native kernel image, constructing a triggering condition based on the information in the native kernel image, and in a case where the triggering condition is met, sending a command to an operating system to kill the program in the native kernel image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the present disclosure will be set forth in the description which follows, and in part will be obvious from the description, or may be learned by the practice of the teachings herein. The features and advantages of such implementations may be realized and obtained by means of the instruments and combinations particularly pointed out in the appended claims. These and other features of the present disclosure will become more fully apparent from the following description and appended claims, or may be learned by the practice of these implementations as set forth hereinafter.

BRIEF DESCRIPTION OF THE DRAWINGS

In order to describe the manner in which at least some of the advantages and features of the present disclosure may be obtained, a more particular description of aspects of the present disclosure will be rendered by reference to specific aspects thereof which are illustrated in the appended drawings. Understanding that these drawings depict only typical aspects of the present disclosure and are not therefore to be considered to be limiting of its scope, aspects of the present disclosure will be described and explained with additional specificity and detail through the use of the accompanying drawings described below.

FIG. 5 illustrates sanitized and native kernel images and debugging information related to the error of FIG. 3 in accordance with various aspects of the present disclosure;

DETAILED DESCRIPTION

Figure 1:
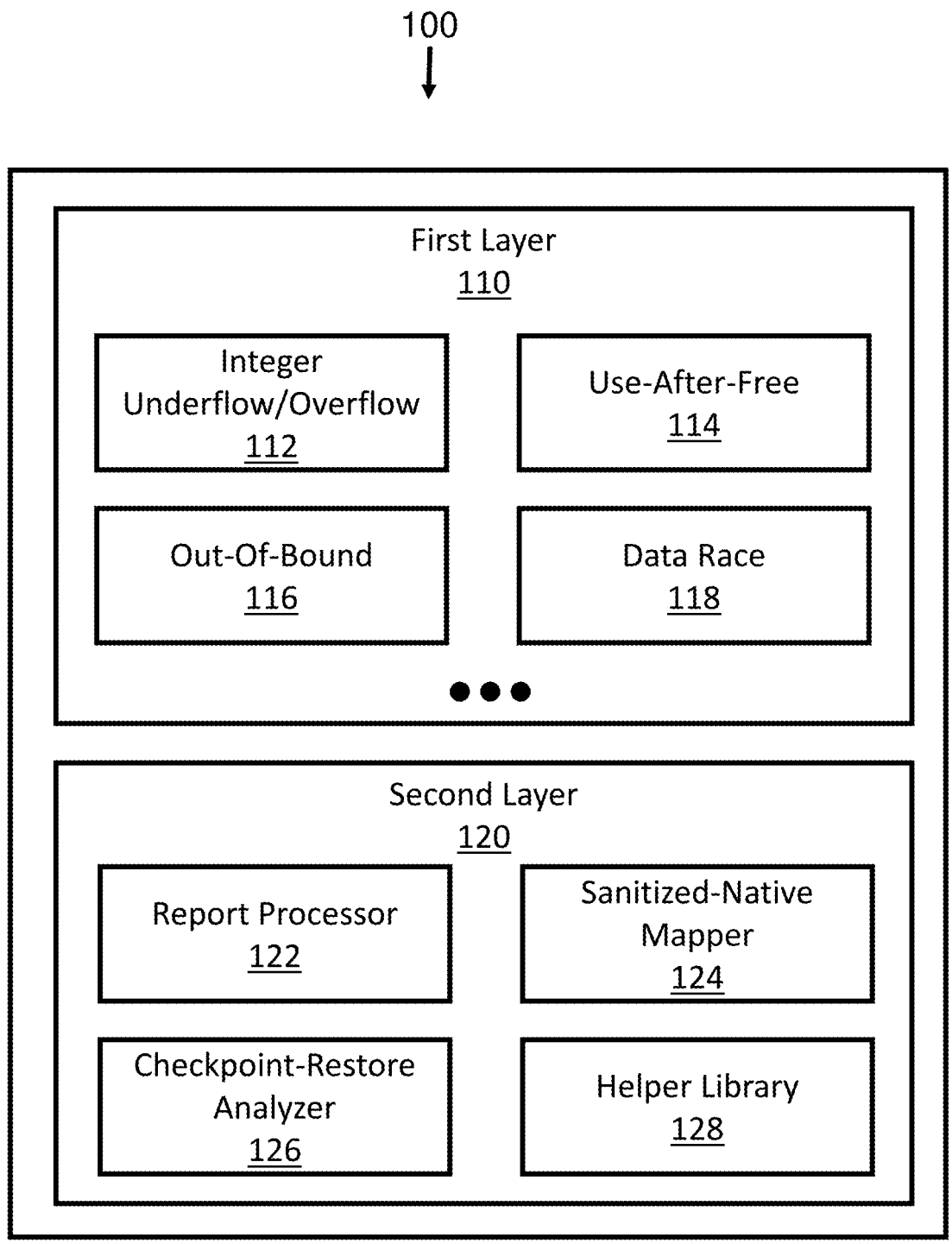
FIG. 1 illustrates a block diagram of a two-layer architecture for preventing errors from being triggered in accordance with various aspects of the present disclosure.

Aspects of the present disclosure, such as the examples disclosed herein, may be beneficial in a variety of respects. For example, and as will be apparent from the present disclosure, one or more aspects of the present disclosure may provide one or more advantageous and unexpected effects, in any combination, some examples of which are set forth below. It should be noted that such effects are neither intended, nor should be construed, to limit the scope of the claimed present disclosure in any way. It should further be noted that nothing herein should be construed as constituting an essential or indispensable element of any present disclosure or aspect. Rather, various aspects of the present disclosure may be combined in a variety of ways so as to define yet further aspects. Such further aspects are considered as being within the scope of this disclosure. As well, none of the aspects embraced within the scope of this disclosure should be construed as resolving, or being limited to the resolution of, any particular problems. Nor should any such aspects be construed to implement, or be limited to implementation of, any particular technical effects or solutions. Finally, it is not required that any aspect implement any of the advantageous and unexpected effects disclosed herein.

It is noted that aspects of the present disclosure, whether claimed or not, cannot be performed, practically or otherwise, in the mind of a human. Accordingly, nothing herein should be construed as teaching or suggesting that any aspects of the present disclosure could or would be performed, practically or otherwise, in the mind of a human. Further, unless explicitly indicated otherwise herein, the disclosed methods, processes, and operations, are contemplated as being implemented by computing systems that may comprise hardware and/or software. That is, such methods processes, and operations, are defined as being computer-implemented.

Aspects of the present disclosure generally relate to systems and methods for remedying a kernel error in an operating system. More particularly, at least some aspects of the present disclosure relate to systems, hardware, software, computer-readable media, and methods for identifying a kernel error based on a sanitizer report and killing the error site corresponding to the discovered error prior to triggering the error site. Thus, the discovered error may be prevented from being triggered. In this way, until the time when an official patch to address the discovered error is released, the operating systems or kernels may be secured from potential harms, damages, exploitation, or errors by attackers or harmful codes.

Disclosed aspects may identify, find, and address errors triggered by or in the operating system kernels. To address previously found, newly discovered, or to-be-discovered errors or 0-day exploits, security analysts may have to diagnose a root cause and develop patches to be merged to the kernel. Sanitizers (e.g., Kernel Address Sanitizer (KASAN), Kernel Memory Sanitizer (KMSAN), and Kernel Concurrency Sanitizer (KCSAN)) may provide a crucial advantage by reproducing errors and generating reports (i.e., sanitizer reports) containing in-depth information about the error. Use of sanitizer reports may help to streamline the error debugging process and enable more efficient patch development. Techniques related to sanitizers may be adopted by various operating system environments. The errors can be addressed at runtime without rebooting the operating system.

The present disclosure provides a solution to prevent discovered errors (including both memory errors and corresponding root causes) from being triggered and exploited in the operating system kernel before official patches are released. Unlike prior works that aim to precisely diagnose the root cause of the error from the report, the present disclosure may take a sanitizer report as input and construct a triggering condition of the corresponding error to be evaluated at runtime. If the condition is met, the error sites in the native kernel image may be skipped and the malicious process may be terminated. Since the error cannot be triggered under this process, it is not possible to exploit it.

A two-layer architecture design may be employed and be easily extended according to various aspects. Disclosed aspects are lightweight, introducing low overhead, and scalable in the presence of multiple errors. Further, disclosed aspects enhance security and reliability in operating system kernels.

Generally, the operating system is a comprehensive software layer that provides a user-friendly interface to interact with computer hardware, manages various system resources such as memory, central processing unit, disk drives, input/output devices, and network interfaces, and provides services to applications, such as process management, multitasking, security, and resource allocation. On the other hand, a kernel is a fundamental component of the operating system, the first program loaded into memory when the computer boots up and remains resident in memory throughout the computer's operation, and handles essential tasks such as process scheduling, memory management, interrupt handling, device management, and system call handling. However, from now on, unless otherwise specified, the terms, "operating system," "kernel", and "operating system kernel," are synonymously used in this disclosure.

Now turning to FIG. 1, illustrated is a two-layer architecture 100 to prevent a kernel error from being triggered according to aspects of the present disclosure. As illustrated, the two-layer architecture 100 may include a first layer 110 and a second layer 120. The two-layer architecture 100 may be enabled at runtime without rebooting the system. The two-layer architecture 100 may be lightweight with a performance overhead less than 3%. Further, the two-layer architecture 100 may be scalable in the presence of multiple errors.

The two-layer architecture 100 may be a temporary solution designed to prevent errors before the official patches are released. Nevertheless, the two-layer architecture 100 may return the kernel to normal states after skipping the error sites in the native kernel image. After the two-layer architecture 100 successfully prevents all errors from being triggered, the kernel may run stably for a period which is much longer than the typical 66 day-time window for release of official patches.

The second layer 120 may be error-independent, meaning that the second layer 120 may be applied regardless of a type or kind of errors. The second layer 120 may include a report processor 122, a sanitized-native mapper 124, a checkpoint-restore analyzer 126, and a helper library 128. The report processor 122 may offer a uniform interface to extract critical information from the sanitizer reports, the sanitized-native mapper 124 may translate critical error information like the error site from the sanitized kernel image to native kernel image that needs protection, and the checkpoint-restore analyzer 126 may return the kernel to normal states after skipping the error sites, and the helper library 128 may provide various helper functions, which can be used to construct triggering conditions and functionalities of the mapping. In an aspect, the helper functions may be implemented by following extended Berkeley Packet Filter (eBPF) standard.

The first layer 110 may have prevention policies in response to errors, thereby being error dependent. In other words, in response to an error, the first layer 110 may include the corresponding policies, which may be expressed in program templates. The policies may be implemented following the eBPF standard. The details of the error may be considered in the program templates for each error. For example, there are various errors including integer underflow/overflow, out-of-bound access, user-after-free, data race, uninitialized memory, wild pointer access, and user memory access, and the first layer 110 may include policy templates 112-118 corresponding to the errors. This list of errors is not meant to be limiting but may include any other errors which have been found and will be found in the future. These errors are described below with the corresponding policies, as examples.

Integer underflow/overflow errors can occur when a value of an integer variable becomes greater than the maximum value or less than the minimum value. The Integer underflow/overflow errors can lead to unexpected behavior in programs, including incorrect calculations, data corruption, or security vulnerabilities (e.g., if unchecked, underflow/overflow leads to buffer overflows). In critical systems or security-sensitive applications, preventing and handling integer underflow/overflow errors is essential to ensure correctness and robustness.

These integer underflows/overflow errors may be further categorized into three specific scenarios: arithmetic overflow resulting from arithmetic operations (e.g., addition or subtraction), shift overflow caused by shift instructions, and truncation from move instructions. The corresponding policy template 112 may have one or more helper functions, which are to be installed before the error site, in which a code causing the integer underflows/overflow error is present. The related operands of a function, where the error resides, are retrieved and doubled the size. For example, if one operand is 32-bit long, the size of the operand is doubled to be 64-bit long. Now, the doubled operand is compared with the 32-bit maximum or minimum to determine whether the value of the operand is greater than the maximum or less than the minimum. Based on the determination, the integer underflow/overflow error can be identified.

Regardless of three scenarios, the policy template 112 corresponding to the integer underflow/overflow errors may be consistent and include helper functions for identifying the error site in the kernel level binary code, skipping the error site, directing the kernel to exit the function including the error site, and terminating the malicious process, which initiates the function.

Use-after-free errors can occur when a program continues to reference memory after it has been deallocated (freed). This can lead to undefined behaviors, such as crashes or security vulnerabilities. The use-after-free errors may have two error sites. One may be at a place where a dangling pointer is created, and the other one may be at a place where the dangling pointer is dereferenced. The corresponding policy template 114 may have one or more helper functions, which are to be installed before a query to use free or deallocated addresses and determine whether or not a dereferenced pointer is referring to a quarantined object. The policy template 114 corresponding to the use-after-free errors may identify an error site in the kernel level binary code, skip the error site, direct the kernel to exit the function including the error site, and terminate the malicious process, which initiates the function.

In a case where the freed object are not recycled, attackers can repeatedly invoke the free site, causing a large amount of memory to be quarantined and affecting kernel functionality. Thus, the policy template 114 corresponding to the use-after-free errors may have to determine when it is safe to release quarantined memory. If not released, a large amount of memory is quarantined and wasted. In this regard, one or more additional helper functions may be installed to periodically sweep the entire physical memory to check existence of dangling pointers.

Out-of-bound errors can occur when a program accesses memory outside the bounds of an allocated memory region, typically an array or a buffer. This type of errors often leads to undefined behaviors, such as process or kernel crashes, data corruption, or security vulnerabilities. These errors may occur not only at the error site but also at corrupted region including stack, heap, or global and static region of memories. To identify the out-of-bound errors, one or more helper functions may be installed before the error site and examine whether or not the access is within the memory bounds. Similar to the policy template 112 corresponding to the integer underflow/overflow errors, the policy template 116 corresponding to the out-of-bound errors may identify an error site in the kernel level binary code, skip the error site, direct the kernel to exit the function including the error site, and terminate the malicious process, which initiates the function.

Data race errors can occur in multithreaded or parallel programs when two or more threads access shared data concurrently without proper synchronization, and at least one of the accesses is a write operation, or when two instructions executed at separate CPUs access the same memory simultaneously without proper synchronization. To identify this type of errors, the corresponding policy template 118 may have one or more helper functions, which are to be installed for each of two or more programs and to use a shared map to determine whether or not there is a data race. The data race errors may be harmful to the integrity and security of the kernel and the system. Thus, the policy template 118 corresponding to the data race errors may identify an error site in the kernel level binary code, skip the error site, direct the kernel to exit the function including the error site, and terminate the malicious process, which initiates the function.

As described above, general policy scheme may be substantially similar in every policy template 112-118 for the errors in the kernel within the first layer 110, while the detail steps for identifying each error and the corresponding triggering conditions may be different from each other. The general policy scheme may include functions for identifying the error site, skipping the error site, directing the kernel to exit the function including the error site, and terminating the malicious process including the function. Some steps may be optional. For example, the malicious process may not be terminated and only the function including the error site may be skipped or terminated.

In aspects, there are errors other than the integer underflow/overflow, out-of-bound access, user-after-free, data race. For example, uninitialized memory access errors can occur when an object is created at a creation site but is not fully initialized. To skip the uninitialized memory access errors, one or more helper functions may be installed after the creation site or prologue of the process, and store the size of the created object. Another helper function may use the object's address to retrieve its size, and use the size to retrieve the full content of the object.

By comparing the content of an object before access and after creation, the checkpoint-restore analyzer 126 may determine whether or not the object has been properly initialized. Aggressive policy may consider the triggering condition met when the contents have at least one byte in common. On the other hand, conservative policy may require the contents to be exactly the same. The aggressive policy may result in false positives if some bytes remain unchanged after initialization, while the conservative policy may miss partial initializations, leading to false negatives. In an aspect, the conservative policy is more effective than the aggressive policy. In another aspect, ideal policy may be to specify the uninitialized range within the object. Since the ideal policy requires expert efforts, the checkpoint-restore analyzer 126 may use the conservative policy by default.

In this way, triggering conditions may be made based on the type of the error and corresponding helper functions from the helper library 128 may be installed at appropriate positions according to the policy template 112-118 corresponding to the type of the error in the sanitized kernel image. Thus, the two-layer architecture 100 may be able to discover errors in the sanitized kernel image, prevent the discovered error from being triggered in the native kernel image, and enable the kernel to be in a normal state without rebooting the system.

Figure 2:
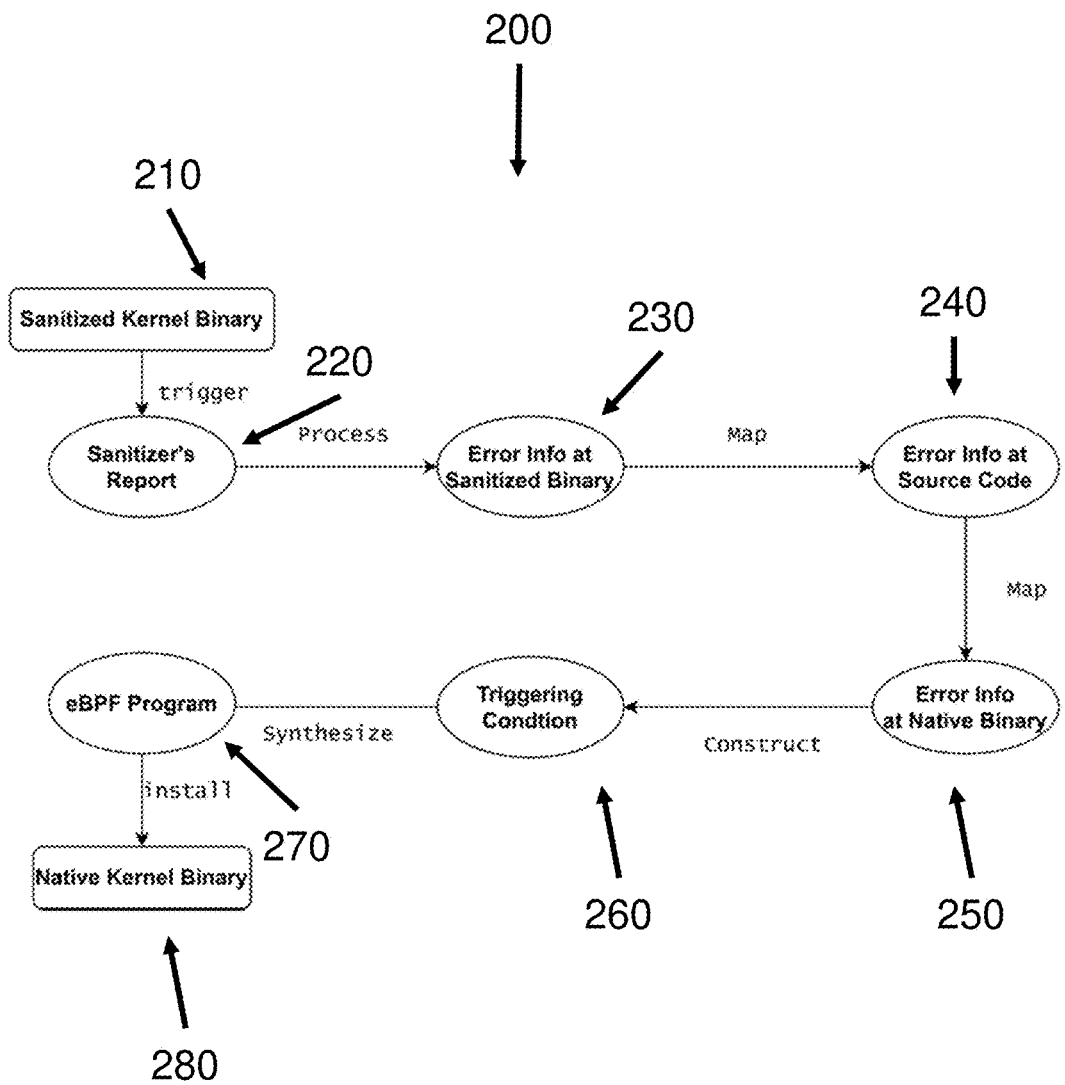
FIG. 2 illustrates a workflow diagram in accordance with various aspects of the present disclosure.

Now turning to FIG. 2, illustrated is a workflow 200 for identifying and addressing an error in the kernel level according to various aspects of the present disclosure. Specifically, FIG. 2 will be described below while referencing to FIGS. 3-6. As described above, various sanitizers may be employed individually or in combination because, for example, UBSAN is suitable for reporting the integer underflow/overflow errors, KASAN may be suitable for reporting out-of-bound errors, and KCSAN may be suitable for detecting data race errors by injecting delay before both accesses, thereby increasing the race window.

The workflow 200 may have three phases: steps 210-240 are included in the first phase, steps 250-270 are included in the second phase, and step 280 is included in the third phase. The first phase is performed in the sanitized kernel level to extract critical information regarding one or more errors in the sanitized kernel image, the second phase is performed to map the error information from the sanitized kernel image to the source code and then to the native kernel image, and the third phase is for dynamically installing helper functions at different kernel locations at runtime to prevent memory errors from being triggered.

Figure 3:
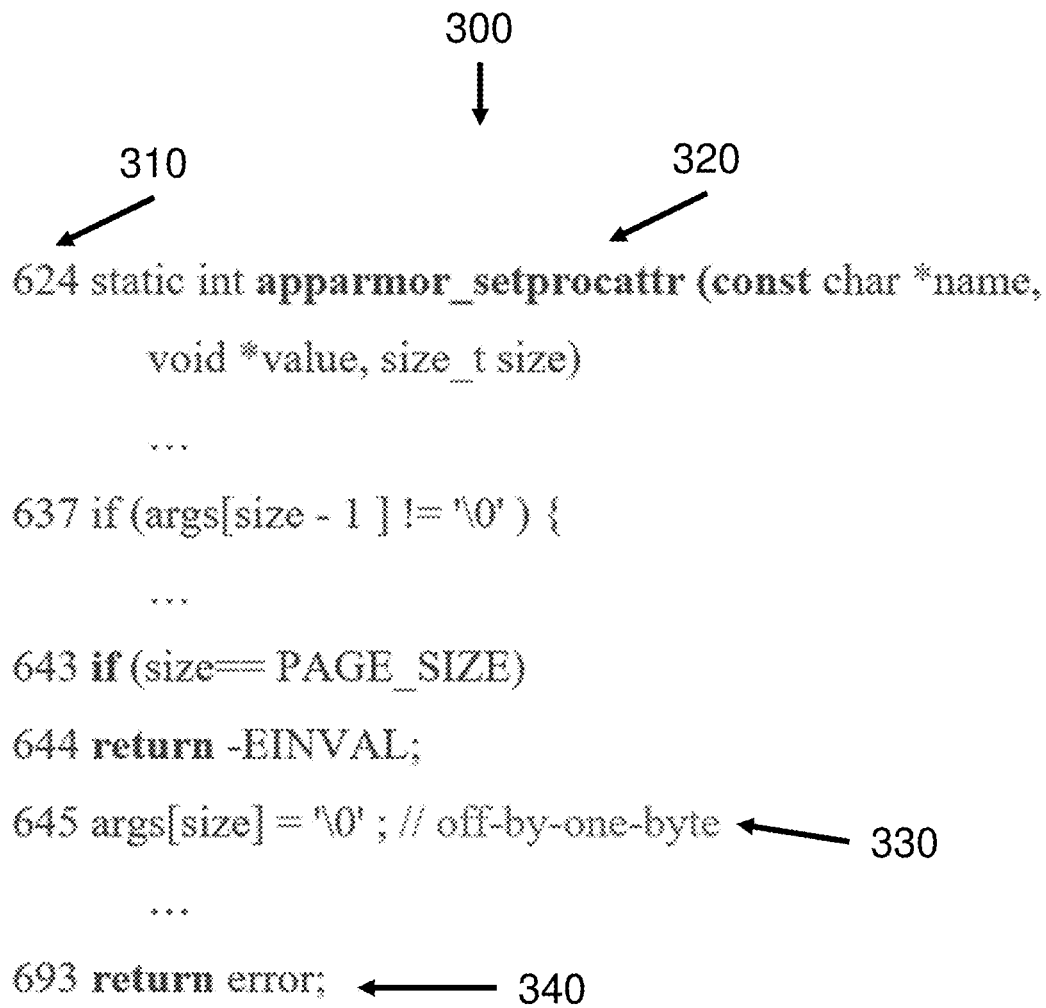
FIG. 3 illustrates an exemplary code including an error in accordance with various aspects of the present disclosure.

The sanitizers may go over binary codes in the sanitized kernel image at step 210 and generate a sanitizer report at step 220. An example source code or function 300 is illustrated in FIG. 3. The example source code 300 may be a function of a process or program and, in the source code file, include a line number 310, a function name 320, "apparmor_setprocattr" with the return type of the function and two arguments, parameter, or operands. The example source code 300 includes an array, "args," of which the maximum size is "size." Since the example source code 300 is in C language, the minimum index is "0" and the maximum index is "size-1." When the number 310 is "645," the example source code 300 has "args [size]" indicating that the index of "args" is greater than the maximum size "size-1" by one. That signifies an out-of-bound error will occur at line 645 when the function 300 is invoked or executed in the sanitized kernel image. Further, the function 300 also includes a return code returning the value of "error." The return code of the function 300 is to be located at the bottom in the binary code of the function 300 in the sanitized kernel image.

More specifically, when the function 300 is called, parameters or operands may be pushed onto a stack or stored in a register, and the function code 300 may be mapped into the sanitize kernel image, which may be in Assembly language or machine executable language. The starting address and the offset address of the function 300 in the memory may be logged by the sanitizers. Further, the sanitizers may generate further information regarding details of each binary code of the function 300 in the sanitized kernel image. Such information may be output in a sanitizer report.

Figure 4:
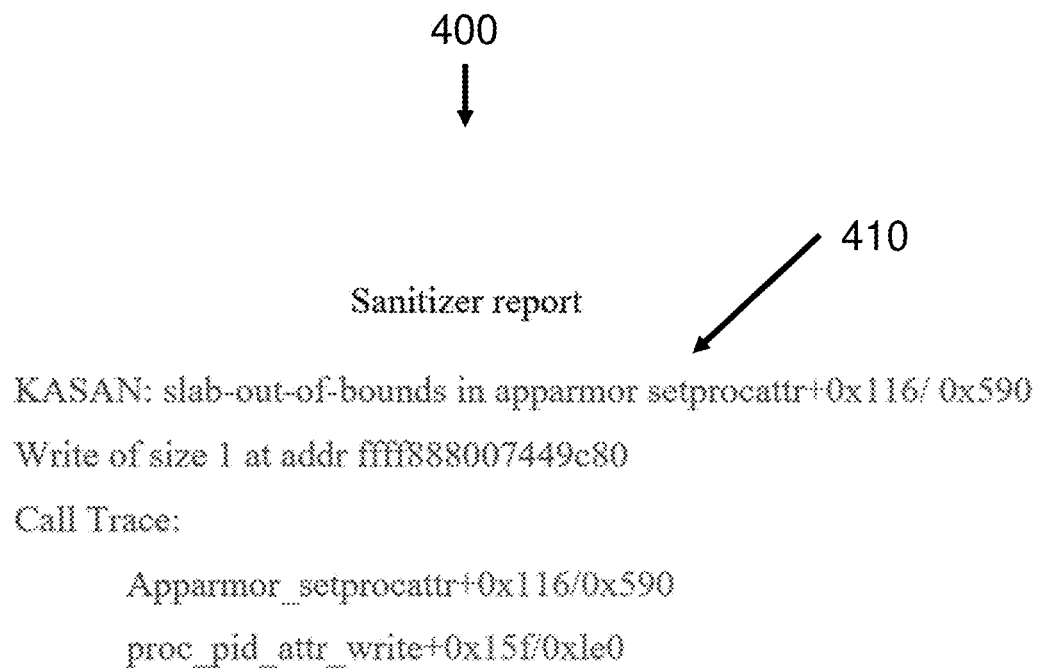
FIG. 4 illustrates an exemplary sanitizer report including the error of FIG. 3 in accordance with various aspects of the present disclosure.

For example, FIG. 4 illustrates an example sanitizer report 400 according to various aspects of the present disclosure. As illustrated, KASAN in the sanitizer, which has generated the sanitizer report 400. In the sanitizer report 400, offset addresses (e.g., "+0x116/0x590") from the starting address of the function 300 are identified in the header 410 and an error is also identified in the header 410. In the sanitizer report 400, the discovered error in the header 410 is an out-of-bound error. Generally, sanitizer reports have more detail information than the example sanitizer report 400.

At step 220, the report processor 122 may receive and analyze the sanitizer report. The report processor 122 may process the sanitizer report 400 to discover further information about the out-of-bound error at step 230. Specifically, the report processor 122 may pinpoint the error site where the out-of-bound error is expected to be triggered.

Furthermore, the report processor 122 may be able to reveal that the error site corresponds to instructions is "movb $0x0, (% r14)" at address "+0x116" offset from the starting address "0xffffffff8180b5b0," as illustrated in the sanitized kernel image 510 of FIG. 5. When the vulnerability is triggered, register % r14 refers to an area outside the legitimate boundary of a kernel object. The sanitized-native mapper 124 may map the instructions in the sanitized kernel image back to a source code statement, such as "args [size]=0" at line 645, as illustrated in the code 330 of FIG. 3 and in the source code 530 of FIG. 5, at step 240.

Since sanitizers may instrument the kernel during compilation, the error site and the triggering condition in the sanitized kernel image and the native kernel image may be distinct from each other at the kernel binary code level. For example, the error instruction in the sanitized kernel image as illustrated in the exemplary code 400 is movb $0x0, (% rsi, % rdi, 1) at the address of apparmor_setprocattr+0x8f, which differs from the address of apparmor_setprocattr+ 0x8f of its counterpart in the native kernel image, as illustrated in the native kernel image 550 of FIG. 5. The sanitized-native mapper 124 may map the source code statement "args [size]=0" to the native kernel image at step 250. After analyzing the mapped movb instruction, the sanitized-native mapper 124 may learn that register % rsi refers to the overflowed buffer args, while % rdi stores the value of the excessive index size. The triggering condition for the discovered out-of-bounds error is encoded as "% rsi+% rdi*1" being beyond the bounds of the buffer args. This triggering condition may be expressed in one or more helper functions from the helper library 128, which may follow the eBPF standard, at step 260.

The helper functions may be synthesized by the checkpoint-restore analyzer 126 at step 270 so as to generate a concrete program to fill corresponding actions and triggering condition in response to the discovered error.

The mapping performed by the sanitized-native mapper 124 is further illustrated in FIG. 5 according to various aspects of the present disclosure. The sanitized kernel image may be exemplified in 510. At the offset 0x116 from the starting address, 0xffffffff8180b5b0, of the function, instruction "movb" includes the out-of-bound error. The sanitized-native mapper 124 may use debugging information 520 to identify the error instruction in the sanitized kernel image 510. The debugging information 520 may be generated according to Debugging With Arbitrary Record Formats (DWARF) standard. The debugging information 520 may include a symbol table (e.g., "args" and "size"), source line information (e.g., "645"), and the file name (e.g., "security/apparmor/lsm.c") of the source code. The debugging information 520 may further include data type, call stack information, local variable information, and global variable information.

For example, the last two lines of the debugging information 520 show that the out-of-bound error is related to line 645 of the source code at address 0xffffffff8180b6b9 in the sanitized kernel image. Based on the name of the arguments, the address, and the line number, the sanitized-native mapper 124 may map the error information to the source code, which is shown in the bottom of the source code 530. Then, the sanitized-native mapper 124 may map the source code 530 to the native kernel image 550. Based on another debugging information 540, the sanitized-native mapper 124 may map line 645 of the source code 530 into address 0xffffffff814dea0f in the native kernel image 550. Specifically, the starting address of the function, apparmor_setprocattr, is 0xffffffff814de980 in the native kernel image 550, and the offset of the instruction corresponding to line 645 of the source code from the starting address is 0x8f. Thus, the instruction corresponding to line 645 of the source code is located at 0xffffffff814dea0f, which is the sum of the starting address and the offset, in the native kernel image 550.

Since the original source code (e.g., 300 of FIG. 3) is compiled by a compiler, which optimizes the code in the sanitized kernel image, such optimization can replace multiple instructions in the source code into a single instruction in the native kernel image. Thus, according to various aspects, the sanitized-native mapper 124 may cross-check two translation flows while mapping in consideration of such optimization.

As described above, the operator is followed in the first translation flow. Additionally, in the second translation flow, the sanitized-native mapper 124 may follow the names of operand variables. In the debugging information 520, the first two lines show the names of the operands, "args" and "size". Further, the debugging information 540 also includes the name of the operands in the first two lines. Thus, the instruction in the native kernel image 550 may be considered an error when its operator and the name of the operand variables do not match the error instruction in the sanitized kernel image 510. In an aspect, the error may be discovered only when each operand variable and the name thereof match the error instruction in the sanitized kernel image 510 and in the native kernel image 550.

Figure 6:
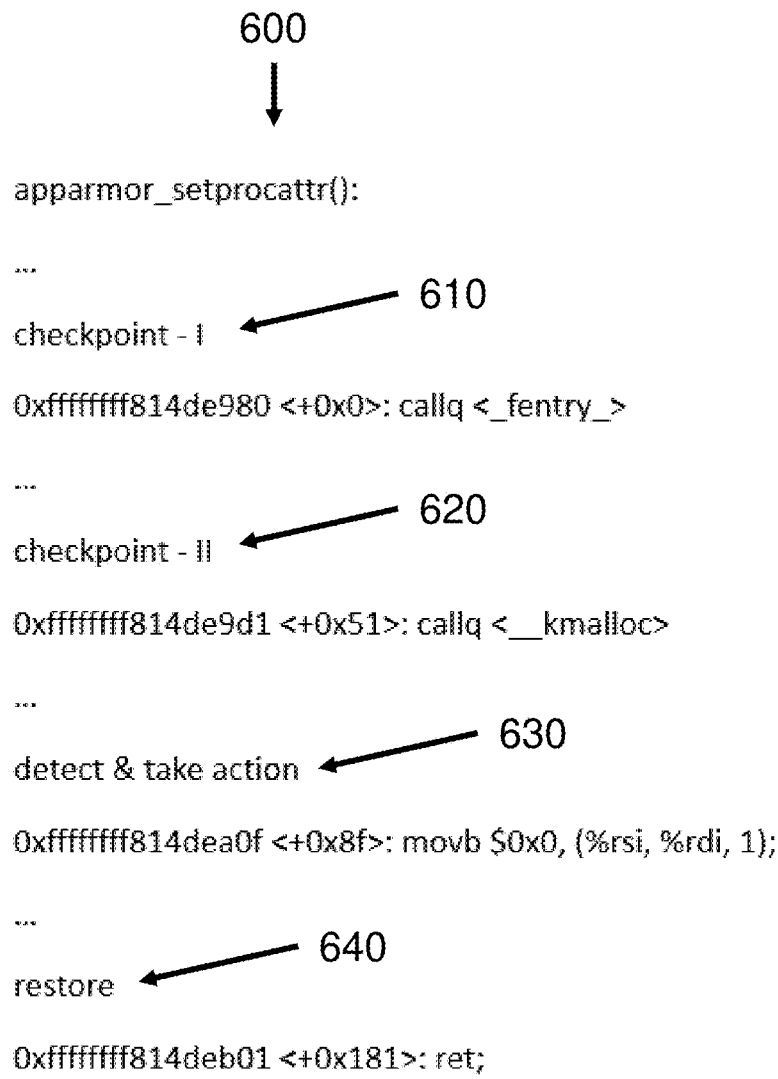
FIG. 6 illustrates locations in runtime native kernel, where helper programs are installed, in accordance with various aspects of the present disclosure.

Now turning back to FIG. 2 while referring to FIG. 6, the sanitized-native mapper 124 may install one or more helper functions at different locations in the native kernel image at step 280 in the third phase. Based on the type of the error and according to the policy template 112-118 in the first layer 110 of FIG. 1, various helper functions may be installed in the native kernel image. For example, in response to the out-of-bound error, helper functions may be installed at two check points 610 and 620. One check point 610 may be located prior to entry or prologue of the function in the source code at address 0xffffffff814de980 and another check point 620 may be located prior to allocation of memory for the array "args" at address 0xffffffff814de9d1.

One helper function may be also installed at a position 630 prior to the entry of the instruction at address 0xffffffff814dea0f, where the instruction corresponds to line 645 of the source code. The helper function installed at the position 630 prior to address 0xffffffff814dea0f may check whether or not the triggering condition is met. When it is determined that the triggering condition is met, the out-of-bound error is detected or discovered and proper actions may be taken to address the error. For example, the triggering condition for the out-of-bound error may be comparing a value of the index of the array args with the maximum or minimum index of the array. The appropriate actions may send a kill signal to the kernel to kill the current process, skip the error site, and direct the kernel to the exit or epilogue of the current process.

In aspects, another helper function may be installed at a position 640 prior to exit of the current process at address 0xffffffff814deb01. This helper function may be performed by the checkpoint-restore analyzer 126 of FIG. 2. To the full restore of the original register context, another helper function may be installed at the position 610 prior to the entry or prologue of the current process containing the error instruction to reserve the register context before the prologue. The helper function at the position 640 may restore the register context after the exit or epilogue of the function by rewriting or replacing the register content with the register context previously reserved by the helper function installed at the position 610.

Figure 7A:
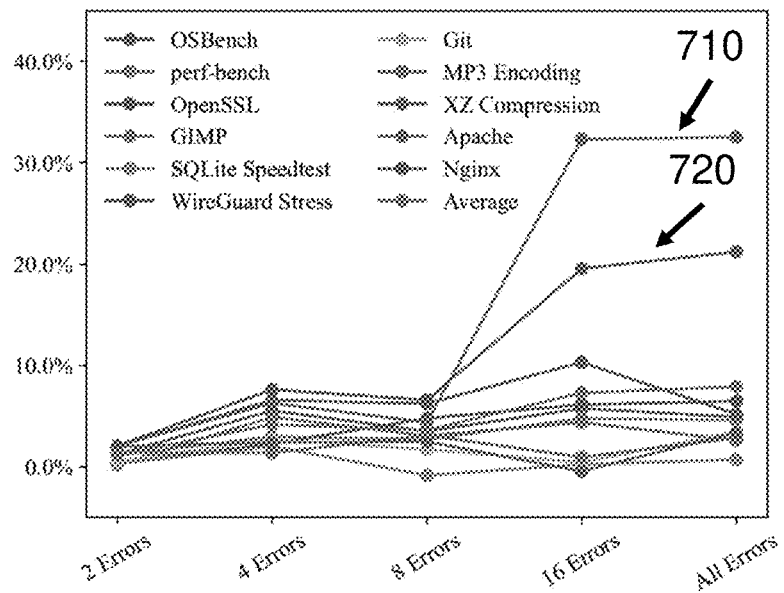
FIG. 7A illustrates a graphical representation of scalability in the presence of multiple errors in accordance with various aspects of the present disclosure.

FIG. 7A illustrates a graphical representation 700 of scalability of the two-layer architecture 100 of FIG. 1 in the presence of multiple errors according to various aspects of the present disclosure. The vertical axis represents performance overheads in percentage, and the horizontal axis represents a number of errors present. The graphical representation 700 includes several trend curves, each of which shows a performance overhead trend along the number of errors. The performance overheads have been evaluated in various operating environments, which includes OSBench, perf-bench, OpenSSL, GIMP, SQLite Speedtest, WireGuard stress, Git, MP3 encoding, XZ compression for IO-intensive tasks, Apache, Nginx, and Average, in the presence of the helper functions. As illustrated, most of tasks have less than 10% overhead until 8 errors in the presence of the helper functions. However, when the number of errors are 16 or over, the overhead becomes about 20% or 30% in OSBench and Apache, respectively. Nevertheless, the performance overheads are generally maintained under 10% when the number of errors are greater than 8.

Figure 7B:
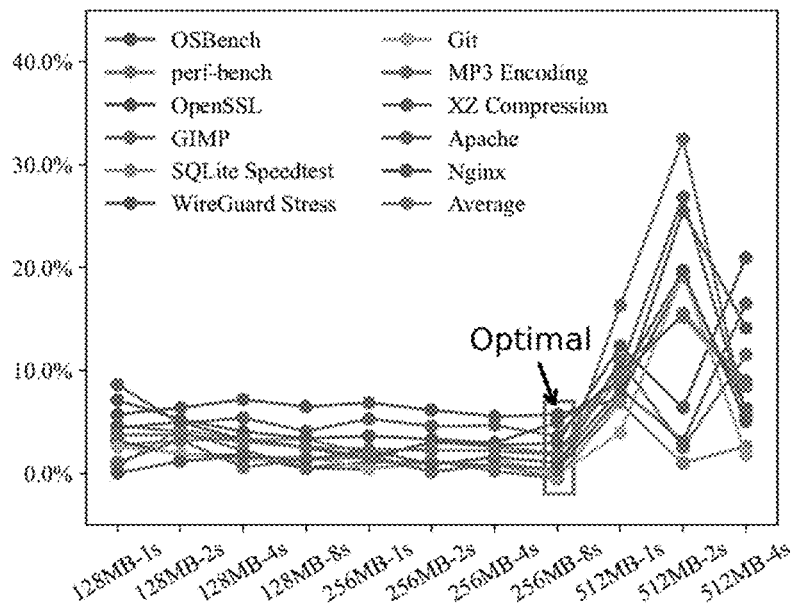
FIG. 7B illustrates a graphical representation of impacts of entire-sweeping mode in the use-after-free policy in accordance with various aspects of the present disclosure.

FIG. 7B illustrates a graphical representation 750 showing impacts of entire-sweeping mode based on the use-after-free policy template in accordance with various aspects of the present disclosure. The vertical axis represents performance overhead in percentage, and the horizontal axis represents combinations of a memory size to be swept in MB and the time difference between two consecutive entire sweeps in seconds. As described above with regard to the use-after-free errors, if quarantined memories are not released, a large amount of memory is wasted and the overhead increases. To optimize the performance overhead, diverse sizes of the memory sweep and various time differences were assessed. According to the overhead trend curves for each task, the overhead are maintained below 10% up to the memory sweep size of 256 MB and the time difference of 8 seconds. After the 256 MB and 8 seconds, the overhead is substantially increased as the size of the memory increases and the time difference increases. Thus, the optimal size of the memory sweep may be 256 MB and the optimal time difference between the memory sweeps may be 8 seconds.

Figure 8:
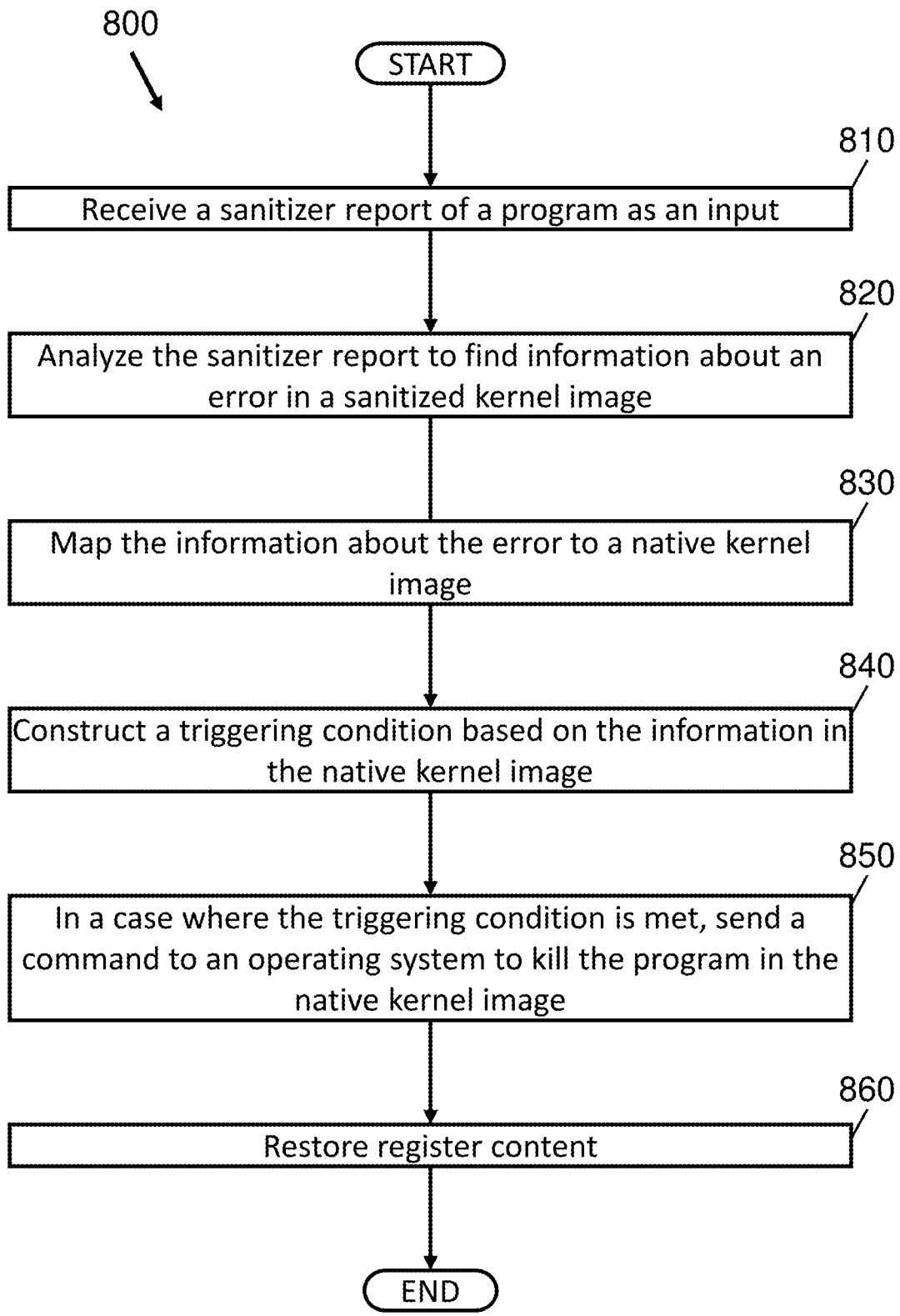
FIG. 8 illustrates a flow chart for preventing errors from being triggered in accordance with various aspects of the present disclosure.

Now turning to FIG. 8, illustrated is a flowchart of a method 800 for preventing errors from being triggered in accordance with various aspects of the present disclosure. The method 800 may protect the kernel when patches are unavailable by discovering an error in the sanitized kernel image, skipping the error site, and killing the current process. Further, the method 800 may be performed with a low performance overhead without rebooting the system. Various operating systems (e.g., FreeBSD, OpenBSD, NetBSD®, Linux, Apple® Mac OS X Server®, Oracle® Solaris®, Windows Server®, Novell® NetWare®, Microsoft® Windows®, Apple® Mac OS X®, UNIX®, and UNIX-like operating systems such as GNU/Linux®) may be benefitted by employing the method 800.

The method 800 is started by receiving a sanitizer report of a program as an input at step 810. The sanitizer report may include detailed information about the program in the sanitized kernel image. The sanitizer may be Kernel Address Sanitizer (KASAN), Kernel Memory Sanitizer (KMSAN), and Kernel Concurrency Sanitizer (KCSAN), which provide a crucial advantage by reproducing errors and generating reports containing in-depth information about the error. Use of sanitizer reports may help to streamline the error debugging process and enable more efficient patch development. Sanitizers may be adopted in various operating system environments. The errors can be addressed at runtime without rebooting the operating system.

Errors to be discovered may include integer underflow/overflow, out-of-bound access, user-after-free, data race, uninitialized memory, wild pointer access, and user memory access. In an aspect, the list of errors is not limited thereto but may include other errors, which have been discovered or will be discovered in the future as the method 800 can be applied in substantially the same way.

Now turning back to FIG. 4, the sanitizer report 400 may include the name of the sanitizer, which generates the sanitizer report 400 in response to the out-of-bound error. As different sanitizers are better suited to discover respective errors, the method 800 may employ various sanitizers individually or in combination so that an appropriate sanitizer report may be received for each error to be discovered at step 810.

In various aspects, the method 800 may further include step 820, which is performed by analyzing the sanitizer report to find information about an error in a sanitized kernel image. For example, the report processor 122 of FIG. 1 may process the sanitizer report (e.g., the sanitizer report 400 of FIG. 4) to discover the error in the program. Based on the discovered error, a prevention policy template corresponding to the discovered error may have been set up previously. For example, in response to an integer underflow/overflow error, the size of an operand or argument, which causes the error, is doubled. In a case where the operand has a size of 32-bit, the size of the operand is doubled to have a size of 64-bit. Now, the value of the 64-bit operand is compared with a maximum or a minimum value of the 32-bit operand. When the value is less than the minimum or greater than the maximum, the integer underflow/overflow error is discovered, respectively.

For another example, in response to an out-of-bound error, an index value of an array is compared with the maximum of the index value. When the index value is greater than the maximum, the out-of-bound error is discovered. In an aspect, the error information may include an error site in the sanitized kernel image.

In various aspects, the method 800 may further include step 830, which is performed by mapping the sanitized kernel image (e.g., 510 of FIG. 5) to a source code (e.g., 530 of FIG. 5), and then the source code to the native kernel image (e.g., 550 of FIG. 5). Debugging information may be also used with the sanitizer report to map the error information to the native kernel image. The debugging information may include more detail information than the sanitizer report. For example, names of arguments or operands, line numbers in the source code, and the file name of the source code may be included in the debugging information. The error may be discovered only when its operand and the name of the operand variable match the error instruction in the sanitized kernel image.

In various aspects, the method 800 may further include step 840, which is performed by constructing a triggering condition based on the error information in the native kernel image. At step 840, various helper functions including the triggering condition may be installed at appropriate locations in the native kernel image. In particular, the helper functions may be installed at locations before the prologue and epilogue of the program and the error site. For example, the helper function installed at the location prior to the prologue may reserve the register content, and the helper functions installed at the location prior to the error site may check whether the triggering condition is met.

In various aspects, the method 800 may further include step 850, which is performed by sending a commend to the operating system to kill the current program in the native kernel image when the helper functions installed at the location prior to the error site determines that the triggering condition is met. At step 850, the helper function installed at the location prior to the error site may also direct the kernel to skip the error site if the triggering condition is met. Thus, before the error occurs, the helper functions may enable the kernel to kill the program without rebooting the operating system.

In various aspects, the method 800 may further include step 860, which is performed by restoring the register content. The helper function installed at the location prior to the epilogue may rewrite or replace the register content with the reserved register content before exiting the program.

Figure 9:
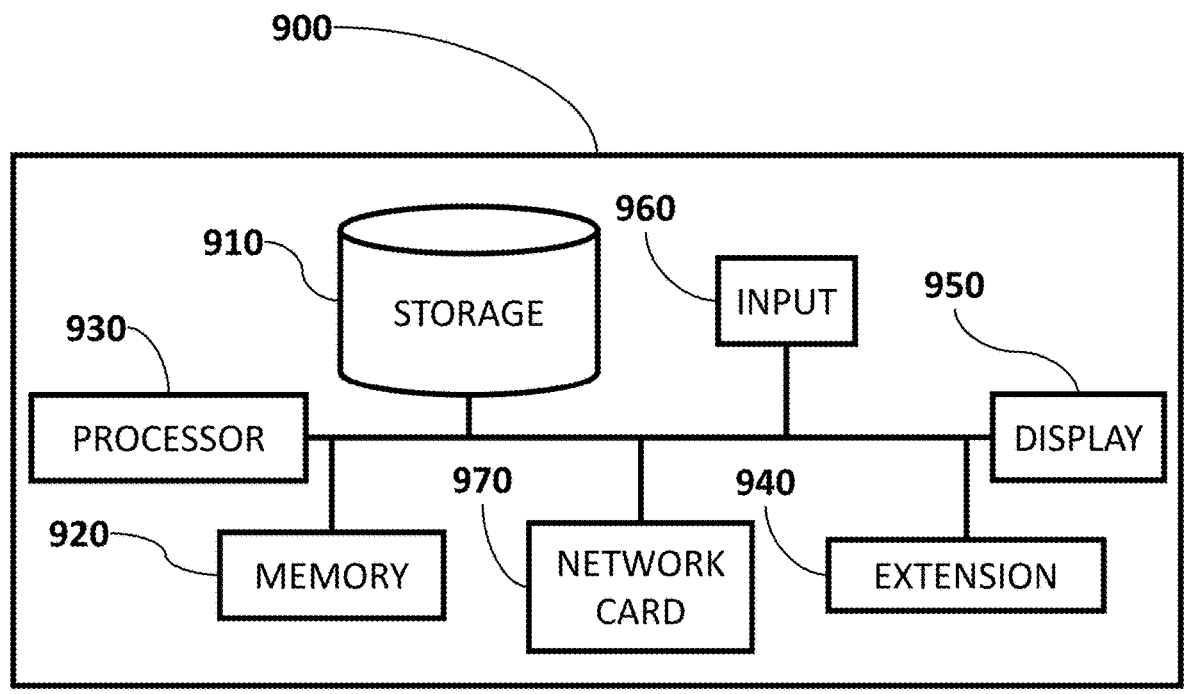
FIG. 9 illustrates a block diagram of a computing device in accordance with various aspects of the present disclosure.

Attention will now be directed to FIG. 9 which illustrates a computing device 900 representative of a computing device, which can implement the two-layer architecture 100 of FIG. 1 or perform the workflow 200 of FIG. 2 or the method 800 of FIG. 8. The computing device 900 may include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, embedded computers, or other devices capable of performing calculations/operations. Persons of skill in the art will recognize that many smart devices are suitable for use in the system described herein. Suitable tablet computers include those with booklet, slate, and convertible configurations, known to those of skill in the art.

The computing device 900 includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some aspects, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In various aspects, the computing device 900 may include a storage 910. The storage 910 is one or more physical apparatus used to store data or programs on a temporary or permanent basis. In some aspects, the storage 910 may be volatile memory and requires power to maintain stored information. In aspects, the storage 910 may be non-volatile memory and retains stored information when the computing device 900 is not powered. In aspects, the non-volatile memory includes flash memory. In aspects, the non-volatile memory includes dynamic random-access memory (DRAM). In aspects, the non-volatile memory includes ferroelectric random-access memory (FRAM). In aspects, the non-volatile memory includes phase-change random access memory (PRAM). In aspects, the storage 910 includes, by way of non-limiting examples, CD-ROMs, DVDs, flash memory devices, magnetic disk drives, magnetic tapes drives, optical disk drives, and cloud computing-based storage. In aspects, the storage 910 may be a combination of devices such as those disclosed herein.

The storage 910 includes executable instructions (i.e., codes). The executable instructions represent instructions that are executable by the processor 905 of the computing device 900 to perform the disclosed operations, such as those described in the various methods. Furthermore, the storage 910 excludes signals, carrier waves, and propagating signals. On the other hand, the storage 910 that carry computer-executable instructions may be "transmission media" and include signals, carrier waves, and propagating signals. Thus, by way of example and not limitation, the current aspects may include at least two distinctly different kinds of computer-readable media: computer storage media and transmission media.

The computing device 900 further includes a processor 930, an extension 940, a display 950, an input device 960, and a network card 970. The processor 930 is a brain to the computing device 900. The processor 930 executes instructions which implement tasks or functions of programs. When a user executes a program, the processor 930 reads the program stored in the storage 910, loads the program on the RAM, and executes instructions prescribed by the program.

The processor 930 may include, without limitation, Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware by performing the basic arithmetic, logical, control and input/output (I/O) operations specified by the instructions. As used herein, terms such as "executable module," "executable component," "component," "module," or "engine" may refer to the processor 930 or to software objects, routines, or methods that may be executed by the processor 930 of the computing device 900. The different components, modules, engines, and services described herein may be implemented as objects or the processor 930 that execute on the computing device 900 (e.g., as separate threads).

In aspects, the extension 940 may include several ports, such as one or more universal serial buses (USBs), IEEE 1394 ports, parallel ports, and/or expansion slots such as peripheral component interconnect (PCI) and PCI express (PCIe). The extension 940 is not limited to the list but may include other slots or ports that may be used for appropriate purposes. The extension 940 may be used to install hardware or add additional functionalities to a computer that may facilitate the purposes of the computer. For example, a USB port may be used for adding additional storage to the computer and/or an IEEE 1394 may be used for receiving moving/still image data.

In some aspects, the display 950 may be a cathode ray tube (CRT), a liquid crystal display (LCD), or light emitting diode (LED). In some aspects, the display 950 may be a thin film transistor liquid crystal display (TFT-LCD). In some aspects, the display 950 may be an organic light emitting diode (OLED) display. In various some aspects, the OLED display is a passive-matrix OLED (PMOLED) or active-matrix OLED (AMOLED) display. In some aspects, the display 950 may be a plasma display. In some aspects, the display 950 may be a video projector. In some aspects, the display may be interactive (e.g., having a touch screen or a sensor such as a camera, a 3D sensor, a LiDAR, a radar, etc.) that may detect user interactions and the like.

A user may input and/or modify data via the input device 960 that may include a keyboard, a mouse, or any other device with which the use may input data. The display 950 displays data on a screen of the display 950. The display 950 may be a touch screen so that the display 950 may be used as an input device.

The network card 970 may be used to communicate with other computing devices, wirelessly or via a wired connection. Through the network card 970, one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The computing device 900 may include one or more communication channels that are used to communicate with the network card 970. Data or desired program codes are carried or transmitted in the form of computer-executable instructions or in the form of data structures vi the network card 970.

The aspects disclosed herein are examples of the disclosure and may be embodied in various forms. For instance, although certain aspects herein are described as separate aspects, each of the aspects herein may be combined with one or more of the other aspects herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of FIGS.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembly, Basic, Batch files, BCPL, C, C+, C++, C#, Delphi, Fortran, Java, JavaScript, machine code, operating system command languages, Pascal, Perl, PL1, scripting languages, Visual Basic, meta-languages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

The aspects disclosed herein are examples of the disclosure and may be embodied in various forms. Although certain aspects herein are described as separate aspects, each of the aspects herein may be combined with one or more of the other aspects herein. It should also be understood that, depending on the example, certain acts or events of any of the processes or methods described herein may be performed in a different sequence, may be added, merged, or left out altogether (e.g., all described acts or events may not be necessary to carry out the techniques). In addition, Specific structural and functional details disclosed herein are not to be interpreted as limiting, but as a basis for the claims and as a representative basis for teaching one skilled in the art to variously employ the present disclosure in virtually any appropriately detailed structure.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules.

The present disclosure may be embodied in other specific forms without departing from its characteristics. The described aspects are to be considered in all respects only as illustrative and not restrictive. The scope of the present disclosure is, therefore, indicated by the appended claims rather than by the foregoing description. All changes which come within the meaning and range of equivalency of the claims are to be embraced within their scope.

What is claimed is:

1. A method for preventing an error from being triggered, the method comprising:
    receiving a sanitizer report of a program as an input;
    analyzing the sanitizer report to find information about an error in a sanitized kernel image;
    mapping the information about the error to a native kernel image;
    constructing a triggering condition based on the information in the native kernel image; and
    in a case where the triggering condition is met, sending a command to an operating system to kill the program in the native kernel image.

2. The method according to claim 1, wherein the method further comprises:
    mapping the information about the error from a binary code of the program in the sanitized kernel image to a source code; and
    mapping the source code to the native kernel image.

3. The method according to claim 2, wherein sending the command to the operating system includes:
    skipping an error site in the native kernel image; and
    terminating the program in the native kernel image.

4. The method according to claim 1, wherein the method further comprises:
    installing a set of programs at runtime to prevent memory errors in the native kernel image.

5. The method according to claim 4, wherein the set of programs is installed at kernel code locations at runtime and triggered when the triggering condition is met.

6. The method according to claim 4, wherein the set of programs are extended Berkeley Packet Filter programs.

7. The method according to claim 4, wherein one of the set of programs is installed at an entry of a function including an error site, which causes the error, to reserve register context before a prologue of the function in the native kernel image, and
    wherein another of the set of programs is installed at an exit of the function to restore the register context after an epilogue of the function in the native kernel image.

8. The method according to claim 1, wherein the error includes integer underflow/overflow, out-of-bound access, user-after-free, data race, uninitialized memory, wild pointer access, and user memory access.

9. The method according to claim 1, wherein the method is performed at runtime without rebooting the operating system.

10. The method according to claim 1, wherein the sanitizer report is generated by a sanitizer at runtime.

11. A system for preventing an error from being triggered, the system comprising:
    a processor; and
    a memory including instructions that, when executed by the processor, cause the system to function as:
        a first layer including prevention policy templates to address errors in a sanitized kernel image; and
        a second layer including a report processor configured to:
            receive a sanitizer report of a program as an input and analyze the sanitizer report to find information about an error in the sanitized kernel image;

map the information about the error to a native kernel image;

construct a triggering condition based on the information in the native kernel image; and in a case where the triggering condition is met, send a command to an operating system to kill the program in the native kernel image.

12. The system according to claim 11, wherein the first layer further includes a first mapper that maps the information about the error from a binary code of the program in the sanitized kernel image to a source code, wherein the second layer includes a second mapper that maps the information about the error from the source code to an error to the native kernel image.

13. The system according to claim 12, wherein the second layer is further configured to:

skip an error site in the native kernel image; and terminate the program in the native kernel image.

14. The system according to claim 11, the error includes integer underflow/overflow, out-of-bound access, user-after-free, data race, uninitialized memory, wild pointer access, and user memory access.

15. The system according to claim 11, wherein the second layer is further configured to, in a case where the triggering condition is met:

install a set of programs at runtime to prevent memory errors in the native kernel image.

16. The system according to claim 15, wherein the set of programs is installed at kernel code locations at runtime and triggered when the triggering condition is met.

17. The system according to claim 15, wherein the set of programs are extended Berkeley Packet Filter programs.

18. The system according to claim 15, wherein one of the set of programs is installed at an entry of a function including an error site, which causes the error, to reserve register context before a prologue of the function in the native kernel image, and wherein another of the set of programs is installed at an exit of the function to restore the register context after an epilogue of the function in the native kernel image.

19. The system according to claim 11, wherein the first layer is error-dependent and the second layer is error-independent.

20. A non-transitory computer readable medium including instructions stored thereon that, when executed by a computer, perform a method for preventing an error from being triggered, the method comprising:

receiving a sanitizer report of a program as an input;

analyzing the sanitizer report to find information about an error in a sanitized kernel image;

mapping the information about the error to a native kernel image;

constructing a triggering condition based on the information in a native kernel image; and in a case where the triggering condition is met, sending a command to an operating system to kill the program in the native kernel image.

* * * * *